Jan. 29, 1957  A. CONORD  2,779,445
MECHANICAL COUPLING MEANS FOR THE DRIVING
OF A SECONDARY APPLIANCE
Filed March 23, 1955  2 Sheets-Sheet 1

INVENTOR.
ANDRÉ CONORD.
BY
Christy, Parmelee & Strickland,
ATTORNEYS.

INVENTOR.
ANDRÉ CONORD.
BY
Christy, Parmelee & Strickland
ATTORNEYS.

United States Patent Office 2,779,445
Patented Jan. 29, 1957

2,779,445

MECHANICAL COUPLING MEANS FOR THE DRIVING OF A SECONDARY APPLIANCE

André Conord, Paris, France, assignor to Societe Moderne d'Appareils Menagers Conord, Paris, France, a French company Application March 23, 1955, Serial No. 496,258

4 Claims. (Cl. 192—.02)

This invention relates to an electrically driven appliance with mechanical coupling means for the driving of a secondary appliance. For example, certain vacuum cleaners are provided with a drive-take-off, with which the secondary appliance, such as a polisher, a mixer or other domestic appliance can be coupled. For reasons of safety, it is necessary that the actions of connecting and disconnecting the secondary appliance be possible only when the motor of the main appliance has stopped. However, absent-mindedness on the part of the user can lead to a false move, which might have unpleasant, or even dangerous, consequences. The object of the invention is a device intended to overcome these difficulties and prevent coupling or uncoupling of the secondary appliance to or from the drive take-off whilst the main appliance is "live."

A primary object of the invention is to provide an interlock between the coupling means of the secondary appliance and the plug or switch which puts the motor of the main appliance into or out of circuit, so that it is impossible to couple up the secondary appliance if the plug itself is already inserted or if the switch is "on," or to uncouple the secondary appliance without previously unplugging or switching off the main appliance.

A second object of the invention is a particular construction to effect this interlocking between the said power plug or switch and the drive take-off for the secondary appliance.

Figure 1:
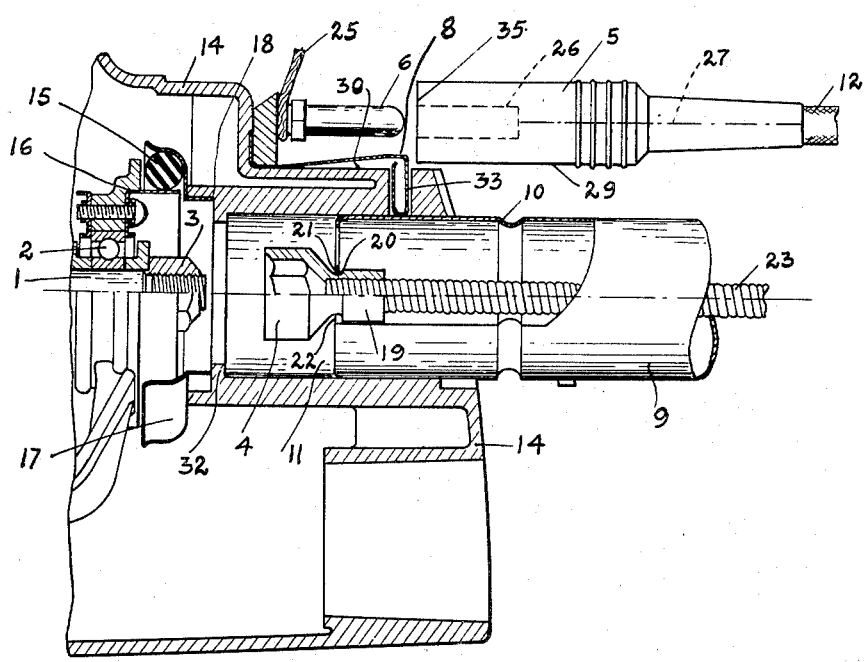
Figure 1 is a longitudinal sectional elevation of part of an electrically driven appliance with its plug disconnected, in which condition the drive take-off for a secondary appliance is free to be connected or disconnected.

In the example illustrated, it may be supposed that the main appliance is an electrically driven vacuum cleaner, with a drive take-off for the coupling up of a secondary appliance such as a mixer or polisher. Reference numeral 1 indicates the end of the vacuum cleaner motor shaft, turning in a ball bearing 2, and at the end of which there is a drive take-off device or fixed coupling part consisting here of a hexagonal nut 3. This assembly is held in the casing 14 by an inserted cylindrical part 16 supported in the grip of an elastic ring 15, which itself is held in position in a channelled ring 17 fixed at 18 in the casing 14.

The coupling means for the secondary appliance comprises a removable coupling part in the form of a socket 4 the interior of which has a hexagonal shape corresponding exactly to the contour of the nut 3. The socket 4 is supported so that it can revolve without sliding axially, in a mounting 9 which may be cylindrical, as shown.

This mounting 9 is insertable into a cylindrical recess 11 in the housing 14, said recess 11 being coaxial with the nut 3. The dimensions of the assembly are such that, when the mounting 9 is fully inserted in the recess 11, the socket 4 fits over the hexagonal nut 3 and a coupling is thereby effected. The socket 4 is extended by a cylindrical part 19, in which is cut a groove 20 which accommodates the edge 21 of an orifice 22 in the end wall of the mounting 9. The clearance between the groove 20 and the edge 21 permits the rotation of the socket 4 which cannot move axially, however, because of the engagement of the edge 21 in such groove 20. Rotation of the coupling parts 3, 4 is transmitted to the secondary appliance by means for example of a flexible shaft 23 connected with the socket 4.

Near the outer surface of the wall enclosing the recess 11 and on the housing 14, there are fitted two terminal pins 6, which are connected with the motor of the vacuum cleaner by leads 25. A plug device 5, is fitted with sockets 26 corresponding to the pins 6, to which current is supplied by conductors 27 of a cable 12 connected with the plug device 5. The dimensions of the assembly are such that, when the sockets of the plug device 5 are engaged on the pins 6, the lower part 29 of the plug device is in close proximity to the outside surface 30 of the wall enclosing the recess 11. According to the invention, the mounting 9 and the plug device 5 are interlocked in a manner now to be explained. This interlocking is effected by the combination of a blade spring 8 formed with a finger 33, which finger co-operates with a groove 10 formed in the mounting 9, at a distance from the end wall 22 equal to the distance between the end wall 32 of the recess 11 and the finger 33. The finger 33 can move radially in a hole 34 in the wall enclosing the recess 11.

The functioning of the device is easy to follow. When sockets of the plug 5 are not engaged on the pins 6 (Figure 1), i. e. when the motor is at rest and the coupling part 3 is not revolving, the mounting 9 can be pushed without difficulty right into the recess 11 so that the socket 4 will couple up with the nut 3 as a result. But so long as the mounting 9 is not fully inserted, it is impossible to push on the plug 5, because the finger 33 of the spring 8 is forced outwards by the mounting 9 and lies in the path of the end 35 of the plug 5 to prevent insertion of the latter.

Figure 2:
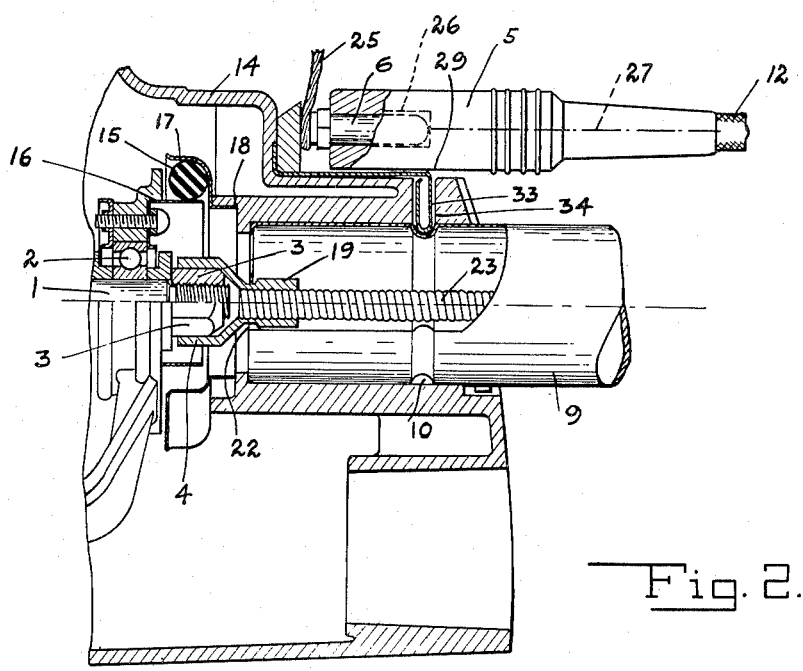
Figure 2 is similar to Figure 1 but shows the drive take-off for the secondary appliance coupled up and the power plug inserted for the running of the motor of the main appliance.

Once the mounting 9 is pushed fully home (as shown in Figure 2), the plug 5 can be inserted for its sockets to engage on the pins 6, because the finger 33 of the spring 8 can then enter the groove 10 and remove itself from the path of the plug 5. But while the parts are in this position, it is not possible to withdraw the mounting 9, since the finger 33 of the spring 8, is lodged in the groove 10 and prevents this; to effect this withdrawal, it is essential that the plug 5 be first withdrawn from the pins 6, so that the spring 8 is then free to be flexed for the removal of the finger 33 from engagement with the groove 10.

On the other hand, if, when the mounting 9 has been withdrawn from its recess 11, the plug 5 is engaged on the pins 6, it is then impossible to replace the mounting 9 in its recess, because the end of the finger 33 projects, so that the end 22 of the mounting 9 strikes this finger 33 and prevents the mounting from being inserted in the recess 11.

Thus, the insertion or withdrawal of the socket coupling part 4 can only take place whilst the plug 5 is not engaged on the pins 6, i. e. whilst no current is being supplied to the motor of the main appliance.

Furthermore, the current can only flow in the motor of the main appliance when the drive take-off for the secondary appliance is either fully coupled or fully uncoupled.

Figure 3:
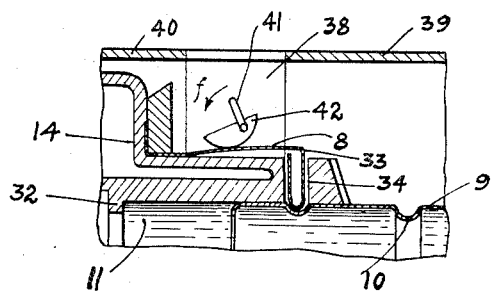
Figure 3 is a fragmental sectional view of a modification.

In the alternative arrangement shown in Figure 3, the blade spring 8 controlling the insertion of the mounting 9 in the recess 11 is no longer put into its locking or inoperative positions by the application of a plug device such as 5, but by the manipulation of a switch which controls the supply of current to the motor of the appliance. This diagram shows a switch 38 mounted on the casing 14, to which the electric current is conducted by means of a lead 39 from the main supply and is then led by a conductor 40 to a terminal of the motor of the vacuum cleaner.

In Figure 3, the switch is shown in the "off" position. It is operated by a lever 41, on the pivot of which is keyed an eccentric 42, touching the spring 8. It can be seen that, if the lever 41 is moved in the direction of the arrow *f*, to "make" the motor circuit, the finger 33 of the spring 8 is lowered into the path of the mounting 9. On the other hand, if the switch is in the "off" position, the finger 33 is completely within the recess 34, so that the mounting 9 may be inserted or withdrawn without difficulty.

I claim:

1. A coupling for driving a secondary appliance by the electric motor of a main appliance comprising in combination: a fixed coupling part located on the main appliance and rotationally driven by the electric motor; a second coupling part axially movable in relation to the first and connected, for the purpose of transmission of movement, to the accessory appliance; a mounting for the second coupling part adapted for connecting or disconnecting said two coupling parts; make and break means for the circuit of the electric motor; a locking device between said mounting and said make and break means, the latter being adapted for pushing said locking device into its operative position when the motor circuit is made in which position the locking device either blocks the entry of said mounting for making the coupling, or locks such mounting in the coupling position if said mounting has already been inserted.

2. A coupling as claimed in claim 1, wherein the make and break means for the motor circuit consists of a socketed plug co-operating with terminal pins fitted to the main appliance and with a guide surface on the main appliance, and the said mounting is a sleeve device supporting the second coupling part this sleeve being formed with a depression and being insertable in a recess in the main appliance the coupling means further comprising: a partition separating the aforesaid recess from the aforesaid guide surface, a hole in the aforesaid partition, coinciding with the depresssion in the sleeve when the latter is in the coupling position; a spring locking device slidable in this hole, and means on the plug device for engaging the locking device and retaining the latter in its operative position after the insertion of said plug device.

3. A coupling as claimed in claim 1, wherein the locking device has a projection which, in the position wherein the motor circuit is broken, lies in the path of insertion of the movable coupling part.

4. A coupling as claimed in claim 1, wherein the means of making or breaking the motor circuit consists of a switch operated by a device carrying a cam, and wherein the mounting of the second coupling part is a sleeve insertable into or removable from a recess in the appliance for coupling and uncoupling the parts, this sleeve having a depression, the coupling means further comprising a partition of the main appliance separating the aforesaid recess from the switch-operating device, a hole in the aforesaid partition coinciding with the depression in the sleeve when this latter is in the coupling position, a catch device slidable in this hole, and urged by a spring towards the position of non-engagement, the cam of the switch, when the switch is in the "on" position, pressing on the catch device and causing it to penetrate through the hole into the recess of the sleeve by overcoming the aforesaid spring.

References Cited in the file of this patent

UNITED STATES PATENTS

| | | |
|---|---|---|
| 1,125,521 | Harrison | Jan. 19, 1915 |
| 1,847,112 | Jordon | Mar. 1, 1932 |
| 2,163,895 | Staples | June 27, 1939 |
| 2,351,485 | Conkle | June 13, 1944 |
| 2,443,084 | Rhodes | June 8, 1948 |
| 2,486,254 | Briskin et al. | Oct. 25, 1949 |